A. A. FREEMAN.
COMBINED TIRE GAUGE AND FILLING VALVE.
APPLICATION FILED JAN. 3, 1921.
1,420,997. Patented June 27, 1922.
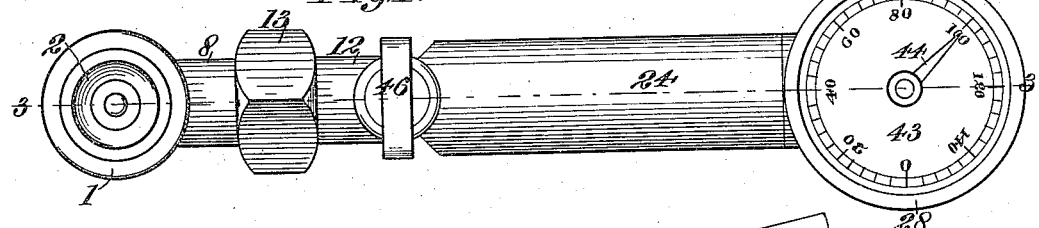
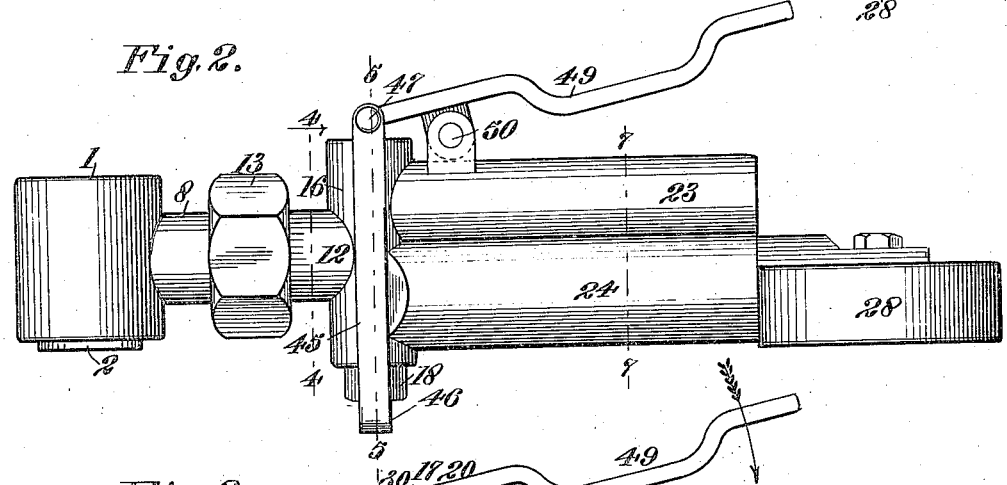
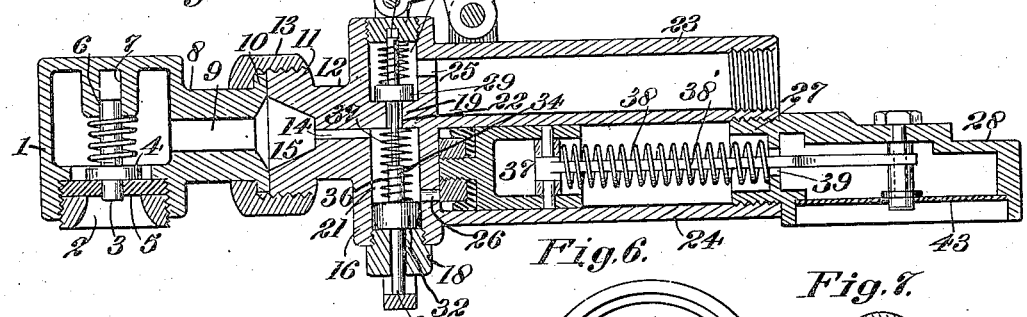
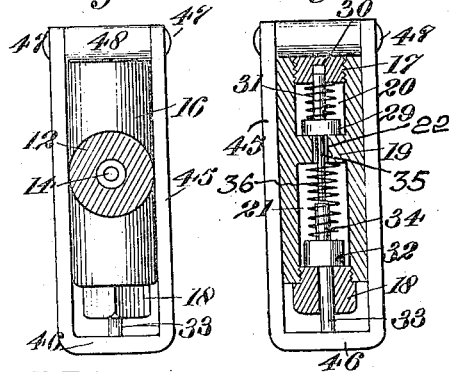
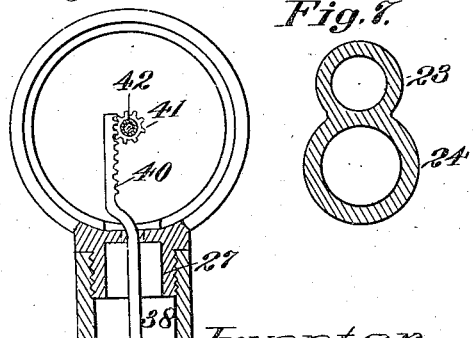
Inventor.
Arthur A. Freeman

UNITED STATES PATENT OFFICE.

ARTHUR A. FREEMAN, OF OAKLAND, CALIFORNIA.

COMBINED TIRE GAUGE AND FILLING VALVE.

1,420,997.　　　　Specification of Letters Patent.　　Patented June 27, 1922.

Application filed January 3, 1921. Serial No. 434,572.

*To all whom it may concern:*

Be it known that I, ARTHUR A. FREEMAN, a citizen of the United States, and resident of Oakland, county of Alameda, State of California, have invented a new and useful Combined Tire Gauge and Filling Valve, of which the following is a specification.

My invention, while relating in general to a combination valve and gauge structure, has reference more particularly to a combination tire gauge and filling or inflating valve.

While various attempts have been made to combine a tire inflating valve with a gauge so that the inflated pressure of the tire may be accurately determined by means which will always be convenient, such attempts have fallen short of providing a practical solution of the problems involved. It is, therefore, the object of the present invention to overcome the unsatisfactory results controlling these heretofore known devices and, in the first place, produce a rigid construction which will be capable of withstanding the abuse which must necessarily be encountered in devices of this kind, and to further render the manipulation of the same exceedingly convenient.

A still further object is to produce a device of this character which will be simple and cheap to manufacture, and without embodying an undue number of unnecessary parts and special contrivances.

With these and further objects in view, the invention will be more readily understood with reference to the accompanying drawing, in which Figure 1 is a side view in elevation of the preferred form of the device; Figure 2 is a plan view; Figure 3 is a horizontal section on the line 3—3, Figure 1; Figure 4 is a cross-section on the line 4—4, Figure 2; Figure 5 is a cross-section on the line 5—5, Figure 2; Figure 6 is a vertical section through the gauge, and Figure 7 is a cross-section on the line 7—7, Figure 2.

Referring now to the drawing in detail, (1) represents the usual filling valve, which is adapted to be inserted over the valve stem of a pneumatic tire, with the cup-shaped opening (2) thereof closely engaging the stem so as to prevent leakage. This cup-shaped opening usually has a rubber throat for this purpose.

The valve includes a protruding stem (3) with a disc (4) mounted above the same to close the opening in the disc (5) through which the stem protrudes. The stem (3) may extend through the disc (4) in a relatively long internal stem (6) which is housed in the guide (7). The valve (1) may or may not be constructed with these details, as the structure of the same is immaterial in so far as concerns the operation of the device.

Entering the valve (1) from the side thereof and as an integral part thereof, is a neck (8) which has a bore (9) with a flange (10) on the neck adapted to abut against the enlarged threaded end (11) of a short piping (12), with a coupling (13) carried by the neck (8) with internal threads adapted to engage the threads of the enlarged end (11) of the piping (12) so that the valve (1) is free to be rotated to present the cup-shaped opening (2) in the position where it may engage the valve stem of the tire at a convenient angle.

The piping (12) includes a small bore axial duct (14) which terminates in a relatively large distributing opening (15) in the enlarged end (11) of the piping, so as to provide an uninterrupted passage through the piping (12), through the neck (8) and into the valve (1).

Formed as an integral part of the piping (12) is a transverse barrel-shaped housing (16), the ends of which having threaded openings made to receive the threaded plugs (17) and (18) respectively. The housing is divided intermediate its ends by a suitable partition (19) to leave a chamber (20) on one side of the partition and a chamber (21) on the opposite side thereof. The small bore axial duct (14) terminates in the chamber (21) and communication between the chamber (20) and the chamber (21) is established through a small opening (22) in the partition (19).

Formed as an integral part of the barrel-shaped housing (16) and arranged transversely thereof is a pair of elongated cylinders (23) and (24), each of which being hollow, with an opening (25) establishing communication between the cylinder (23) and the chamber (20), and an opening (26) establishing communication between the cylinder (24) and the chamber (21). These two cylinders provide a convenient hand-grip for the device.

The free end of the cylinder (23) is threaded so as to receive the hose of the air line, while the free end of the cylinder (24) is likewise threaded to receive a nipple (27) of an air gauge (28).

Confined within the chamber (20) of the barrel-shaped housing (16) is a disc or the like valve (29) having a stem (30) which is seated and guided in an aperture on the inside face of the plug (17), with a coil spring or the like (31) carried by a stem with the influence of the same adapted to normally maintain the valve over the opening (22), thus closing the same.

A similar valve (32) is arranged in the chamber (21) of the barrel-shaped housing (16). This valve has stem extending from its opposite faces. One of these stems, namely, (33), protrudes through an opening in the plug (18), while the other stem, namely, (34), extends axially of the chamber (21) and has a small extension (35) which projects through the opening (22) in the partition (19) and bears against the valve (29). A coil spring (36) is wound around this stem, with the influence of the same normally tending to maintain the valve (32) against the inner face of the plug (18). The operation of these valves and the purpose of the same will be presently described.

Housed within the cylinder (24) is a suitable piston or plunger (37) which includes a connecting rod (38) extending through an opening (39) in the radial part of the nipple (27) of the gauge (28) and into the gauge. The end of this rod is constructed with a suitable rack (40), the teeth of which matching with the teeth of a small pinion (41) keyed to the spindle (42) of the gauge.

The gauge, in so far as concerns the illustrative embodiment, has the customary dial (43) with the graduations and numbers on the face thereof representing pounds of pressure, with a hand (44) keyed or otherwise fixedly mounted to the spindle (42) and adapted to be revolved thereby to co-operate with the graduations and numbers on the dial face for registering or indicating purposes.

Mounted upon the barrel-shaped housing (16) and surrounding the same, is a looped strap (45), the looped end (46) of which overlays the exterior end of the stem (33) of the valve (32) with the parallel portions of the strap extending longitudinally along opposite sides of the barrel-shaped housing (16) and terminating with the ends thereof spaced apart and having openings made to receive a suitable pintle. The ends of the pintle are riveted over as at (47), with the pintle made to receive an eye (48) on the end of a lever (49). This lever (49) extends longitudinally of the handgrip formed by the cylinders (23) and (24) and is fulcrumed thereto as at (50). The lever is bent to make the same easily grasped by the hand when the hand grips the cylinders for manipulating the device.

The operation of the device is substantially as follows:

The influence of the coil springs (31) and (36) normally tends to maintain the valves (29) and (32) in the position as shown best in Figure 3; that is, the valve (29) is closing the opening (22) in the partition (19) of the barrel-shaped housing (16), and the valve (32) is away from the opening (26) between the cylinder (24) and the chamber (21); therefore, by inserting the valve (1) over the valve stem of the tire, the air pressure in the tire will be admitted into the valve (1) through the communications between the valve and the chamber (21) through the opening (26), where it will act to move the plunger (37) upwardly in the cylinder (24), causing the rack (40) to rotate the pinion (41) and revolve the hand (44). In this way the existing air pressure in the tire may be determined by the gauge (28). When the valve (1) is removed from the valve stem of the tire, the coil spring (38') will return the plunger (37) to normal position.

If it is desirable to introduce an additional amount of air in the tire, after a reading has been obtained as above described, the lever (49) will be pulled down, which will impose a pull on the strap (45), causing the valve stem (33) to overcome the influence of the coil spring (36), and moving the valve (32) to close the opening (26). Simultaneously with this movement, the stem extension (35) of the stem (34) will operate to unseat the valve (29) and uncover the opening (22) in the partition (19), which will establish an uninterrupted communication through the cylinder (23), the chamber (20), through the opening (22) into the chamber (21), through the small bore duct (14) and into the valve (1), where the air may be thus introduced into the tire. The moment the lever (49) is released, the influence of the springs (36) and (31) will operate to move the valves (29) and (32) to their normal positions as shown in Figure 3, thus cutting off the introduction of air from the air line, but leaving an uninterrupted communication from the valve (1) into the cylinder (24) where it will actuate the plunger (37) to effect a reading of the gauge (28) as previously described. After this reading has been obtained, if there is not sufficient air in the tire, the lever (49) may be again moved to unseat the valve (29) and to move the valve (32) to close the opening (26) into the cylinder (24), whereupon an additional amount of air will be introduced into the tire.

It is to be noted that the primary parts of the device are made integral one with the other. This is true except in parts which are threaded together, or otherwise fixed to cooperate.

I claim:

A device of the class described, comprising a pair of parallel cylinders, one having a connection for a source of air pressure supply and the other carrying a pressure gauge, both of said cylinders being mounted to a transverse barrel shaped housing, said housing being divided to leave two chambers each of which communicating with one of the said cylinders, a communication between the chambers within the said housing and a communication between that one of the chambers, which communicates with the cylinder that carries the pressure gauge, with a tire filling valve, and means within the said barrel shaped housing for selectively establishing or interrupting the communications between the source of air pressure supply and the tire filling valve and the tire filling valve and the cylinder which carries the pressure gauge, said means comprising a valve in each of the said chambers, said valves being mounted on a single stem with one end of the stem projecting through the end of said barrel shaped housing, and a lever for actuating the valves together having a looped strap straddling said barrel shaped housing and looped over the projecting end of said stem and with the opposite ends of the strap connected to a lever which in turn is pivoted to actuate the valves through said strap and the said stem.

ARTHUR A. FREEMAN.